T. WITMER.
Green-Corn Cutter.
No. 165,968. Patented July 27, 1875.
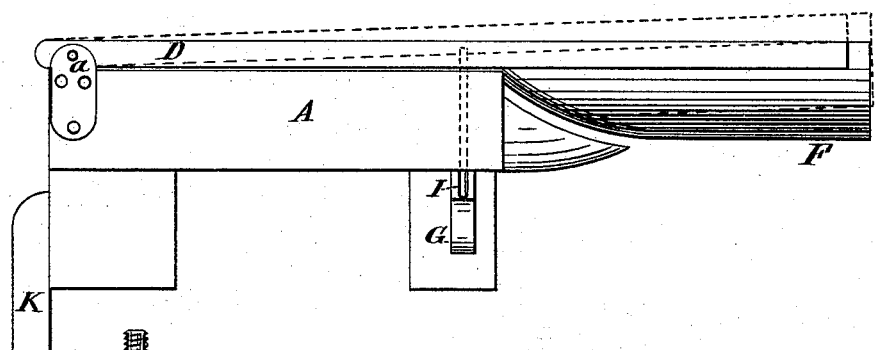
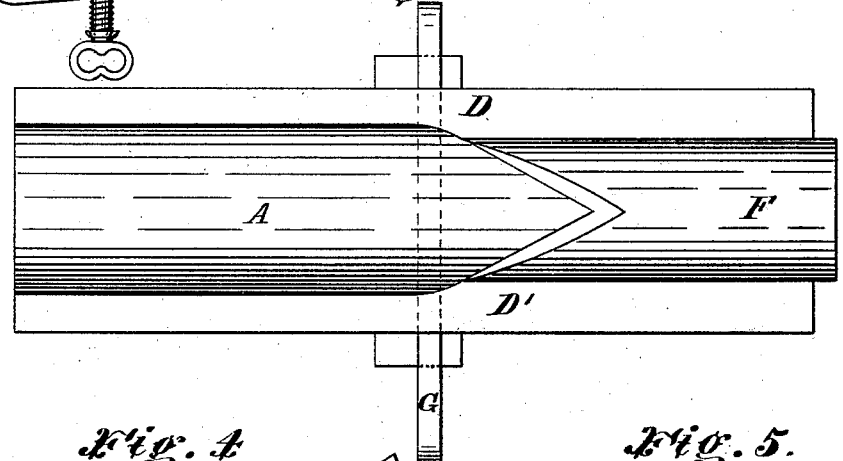
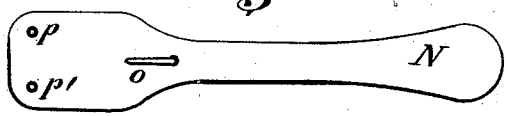
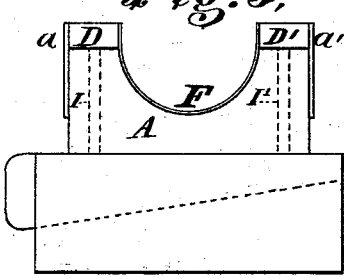
Witnesses.
P. W. English
A. N. Samuels
Inventor.
Tobias Witmer

UNITED STATES PATENT OFFICE.

TOBIAS WITMER, OF BUFFALO, NEW YORK.

IMPROVEMENT IN GREEN-CORN CUTTERS.

Specification forming part of Letters Patent No. 165,968, dated July 27, 1875; application filed October 26, 1874.

*To all whom it may concern:*

Be it known that I, TOBIAS WITMER, of Buffalo, in the county of Erie and State of New York, have invented a Green-Corn Cutter, of which the following is a specification:

The first part of my invention relates to the form of the knife, which is made semi-tubular, or trough-like, of thin sheet-steel, formed with V-shaped cutting-edges, the semi-tubular shape being given so as to conform the shape of the knife to the cylindrical shape of the ear of corn, thus cutting more rapidly than when the knife is flat, and the V-shaped edge is given to it to produce a sliding or diagonal cut, thus cutting easier and more smoothly than when the edge is presented at right angles to the line of motion of the ear, when being pushed over the knife, and also serving to keep the ear in a direct line with the axis of the knife.

The second part of my invention relates to the form of the body of the machine; and consists in making it trough-like, so as to conform nearly to the shape of the ear of corn, and to serve as a gage-board to gage the thickness of the cut, allowing the corn to be slid upon it as it is pushed forward upon the knife. The longitudinal plane of this gage-board lies exactly parallel with the longitudinal plane and axis of the knife, and slightly below it, the knife being raised to the height above the gage-board just equal to the thickness of the cut desired to be made.

The third part of my invention relates to the manner of combining the knife with the gage-board, so as to render it adjustable to any thickness of cut desired. This is done by fastening the knife to the top pieces and pivoting or hinging said top pieces to the gage-board or body in such a manner as to allow the knife and its frame to be raised and lowered, to vary the thickness of cut, as will be clearly demonstrated by the drawings.

The fourth part of my invention relates to the handle or ear-holder, to hold the ear of corn in the operation of cutting, and to prevent the cutting of the fingers.

In the drawings, Figure 1 is a side elevation of the corn-cutter. Fig. 2 is a top view of the same, and Fig. 3 is a front elevation. Fig. 4 represents a side elevation of the ear-holder, and Fig. 5 a bottom view of the same.

A is the body of the machine, which, being formed concave on the upper side, constitutes the trough-like stationary gage-board A. D D' are the top pieces, which lie upon the top edges of the body or gage-board A, and they may be fastened thereto by screws or nails, or they may be attached thereto by hinges $a\ a'$, or other similar devices, so as to be kept firmly in position, directly covering the top edges of A. These top pieces D D' project forward to allow the concave or semi-tubular adjustable knife F to be firmly fastened between them by screws or other equivalent means, as above stated. The top pieces D D' are attached to the body or gage-board A, at their hind ends, by the hinges $a\ a'$ or their equivalents, while their forward ends, with the knife F attached thereto, rest upon the body A and may be raised and lowered by means of the pins I I', which are inserted in corresponding holes in the body A, in which they loosely move up and down, and are operated by the wedge G, so arranged as to hold the knife in any desired position, the thickness of the cut being determined and regulated by the height to which the knife F is raised above the plane of the gage-board A, by pushing in the wedge G. It will be observed that, by raising the knife F with the top pieces D D', when said top pieces are hinged or pivoted at $a\ a'$, the plane of the knife F will be slightly changed from a horizontal plane (and from being exactly parallel with the plane of the gage-board) to a divergent line, corresponding to the radius of a circle, the center of which is at $a$ or $a'$; but this small difference or divergency may be divided in the following manner: The knife F may be fastened to the top pieces D D' in such a manner that when the knife is adjusted to a medium height for cutting the ordinary slice the plane of the knife will be exactly in line parallel with the plane of the gage-board A, and the divergence will be zero (0,) and thus the divergency of the knife from that line, in raising or lowering it the short distance required in practice, will be divided and hardly perceptible; but, if preferred, the knife and top pieces may, without departing from the principle of my invention, be so arranged as to be adjusted horizontally by raising both ends of the top pieces an equal distance. The wedge G is inserted in a mortise or slot in the body A, nicely fitted, so as that the friction may prevent its moving back and forth too easily while in the act of cutting. A pin or stop may also be used to keep it in place.

The ear-holder N, Fig. 4, is a very simple machine, and easily comprehended by examining the drawings. A sharp prong, o, is inserted at the rear end of the concave part of the head, and so arranged as to pierce the rear end of the cob, as the concave part of the head lies on top of the ear, which will thus be held up in a horizontal position, while the sharp points p p' near the fore end will pierce the top of the ear and hold it from rolling over while being cut. Thus the ear is pushed over the knife, and half the corn is cut off. The ear is then brought back, turned over, and the other side shaved off in like manner.

I claim as my invention—

1. The top pieces D D', in combination with the knife F, when attached directly thereto, for the purposes set forth.

2. The trough-like shaped stationary gage-board or body A, in combination with the knife F, substantially as described, and for the purposes set forth.

3. The knife F, top pieces D D', when hinged to the body or gage-board A by hinges a a' or their equivalents, all constructed and arranged substantially as and for the purposes described.

4. The ear-holder N, when constructed substantially as described, and for the purposes set forth.

5. The wedge G, in combination with the pins I I' and the top pieces D D', for the purposes set forth.

TOBIAS WITMER.

Witnesses:
R. W. ENGLISH,
A. N. SAMUELS.